United States Patent [19]

Uchikawa et al.

[11] Patent Number: 4,652,090
[45] Date of Patent: Mar. 24, 1987

[54] DISPERSED IRIDIUM BASED COMPLEMENTARY ELECTROCHROMIC DEVICE

[75] Inventors: Kiyoshi Uchikawa, Tokyo; Tatsuo Niwa, Kawasaki, both of Japan

[73] Assignee: Nippon Kogaku K. K., Tokyo, Japan

[21] Appl. No.: 722,390

[22] Filed: Apr. 12, 1985

[30] Foreign Application Priority Data

Apr. 20, 1984 [JP] Japan .................................. 59-79666
May 11, 1984 [JP] Japan .................................. 59-94058

[51] Int. Cl.$^4$ ................................................ G02F 1/23
[52] U.S. Cl. ...................................................... 350/357
[58] Field of Search ........................................... 350/357

[56] References Cited

U.S. PATENT DOCUMENTS

| | | | |
|---|---|---|---|
| 3,521,941 | 7/1970 | Deb et al. ........................... | 350/353 |
| 4,258,984 | 3/1981 | Beni et al. ........................... | 350/357 |
| 4,350,414 | 9/1982 | Takahashi et al. .................. | 350/357 |
| 4,433,901 | 2/1984 | Takahashi et al. .................. | 350/357 |
| 4,482,216 | 11/1984 | Hashimoto et al. ................ | 350/357 |

Primary Examiner—William H. Punter
Attorney, Agent, or Firm—Shapiro and Shapiro

[57] ABSTRACT

An electrochromic device including one electrode layer (A), a cathodically coloring electrochromic layer (B), an ionic conductive layer (C) if required, a reversibly oxidizable layer (D) and another electrode layer (E), at least one of the one electrode layer (A) and the other electrode layer (E) being transparent, and at least one of the cathodically coloring electrochromic layer (B), the ionic conductive layer (C) and the reversibly oxidizable layer (D) being adapted to contain protons or include a proton source for emitting protons upon application of a voltage. The reversibly oxidizable layer (D) comprises a transparent dispersion layer (D1) which is made by vacuum thin film formation techniques or thick-film processes and which comprises a metal iridium, iridium oxide or iridium hydroxide disperse phase (D11) and a transparent solid dispersion medium (D12), or the reversibly oxidizable layer (D) and the other electrode (E) are replaced with a single transparent conductive dispersion material layer (D1a) which is made by vacuum thin film formation techniques or thick-film processes and which comprises a metal iridium, iridium oxide or iridium hydroxide disperse phase (D11) and a transparent conductive solid dispersion medium (D12a).

22 Claims, 6 Drawing Figures

DISPERSED IRIDIUM BASED COMPLEMENTARY ELECTROCHROMIC DEVICE

BACKGROUND OF THE INVENTION

1. Field of the Invention

The present invention relates to a novel electrochromic device.

2. Description of the Prior Art

An electrochromic device (to be referred to as an ECD hereinafter) comprises a pair of electrode layers at least one of which is transparent and an electrochromic material layer sandwiched therebetween. The ECD colors when a voltage having a magnitude as substantially obtained by a dry battery is applied between the pair of electrode layers. However, when a voltage having an opposing polarity is applied between the electrode layers, the ECD is bleached to return the original transparent state. For this reason, extensive studies have been made to utilize ECDs in a display unit (especially, a numerical display device using a 7-segment display element of an "$\Theta$" shape), a transmitted or reflected light amount control device, and others.

In order to color an electrochromic material such as $WO_3$, electrons ($e^-$) and cations ($X^+$) are simultaneously injected in the electrochromic material. It is assumed that the general reaction upon coloring/bleaching of the material is written as follows:

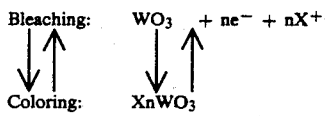

Protons ($H^+$) are used as the cations ($X^+$) since the proton has a small ion radius and high mobility. The cations need not always be in the state of cations. More specifically, it is essential to generate cations when a voltage is applied across the electrochromic device. For protons, water is used as a cation source. Water is decomposed upon application of a voltage thereto in accordance with the following general reaction:

$$H_2O \rightarrow H^+ + OH^-$$

Only a small amount of water is required, so that moisture permeated from the outer atmosphere into the $WO_3$ layer is usually sufficient.

However, even if the $WO^3$ layer is sandwiched between the pair of electrode layers and a reverse voltage is applied between these electrode layers, bleaching cannot be easily performed. This is because electrons ($e^-$) flow in from the electrode corresponding to the cathode even if the reverse voltage is applied across the electrodes so as to bleach the electrochromic material, thereby coloring the electrochromic material due to the presence of cations ($H^+$) in accordance with the following reaction:

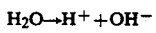

In order to solve this problem, an ECD is proposed by S. K. Deb et al. in Japanese Patent Publication No. 46098/1977 corresponding to U.S. Pat. No. 3,521,941 (Re. 28199), wherein an insulating layer of $SiO_2$, $MgF_2$ or the like is formed between the $WO_3$ layer and one of the electrode layers. Electrons cannot be moved through this insulating layer, but $OH^-$ ions can be freely moved therethrough. These $OH^-$ ions carry an electric charge. This insulating layer is called an ionic conductive layer throughout the specification of the present invention.

The following reaction occurs between the ionic conductive layer and the electrode:

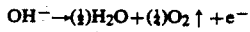

It is assumed that the electrons are emitted toward the anode.

In other words, when the ECD colors, the following reactions are assumed to occur:

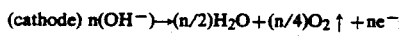

However, when the ECD is bleached, the following reactions are assumed to occur:

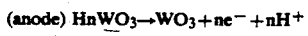

As is apparent from the above reactions, the ECD proposed by S. K. Deb et al. has disadvantages in that coloring does not occur when moisture is not immmediately supplied thereto and that the layers are peeled off due to the generation of $O_2$ and $H_2$ gases.

In order to overcome the drawbacks of the ECD proposed by S. K. Deb et al., Y. Takahashi et al. proposed all solid-state ECD having iridium hydroxide as a reversibly oxidizable layer between the ionic conductive layer and the electrode layer (see U.S. Pat. No. 4,350,414). It should be noted that the $WO_3$ layer is not only a reversibly reducible layer but also a cathodically coloring electrochromic layer.

In the ECD proposed by Y. Takahashi et al., iridium hydroxide is assumed to be subjected to the following reaction during coloring of $WO_3$:

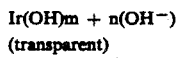

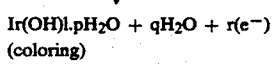

Iridium hydroxide is assumed to be subjected to the following reaction during bleaching:

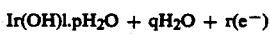

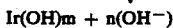

Therefore, water is not consumed but regenerated in this ECD, and $H_2$ and $O_2$ gases are not generated. It should be noted that this ECD having a symmetrical structure need not use the ionic conductive layer when a memory function is not required.

However, the ECD of Y. Takahashi et al. was not completely bleached, i.e., transparent when a high-temperature durability test for a long period of time was performed. As a result, it was found that contrast between coloring and bleaching was degraded.

SUMMARY OF THE INVENTION

It is an object of the present invention to provide an improved ECD including one electrode, a cathodically coloring electrochromic layer, an ionic conductive layer, a reversibly oxidizable layer and another electrode, wherein degradation of contrast is typically prevented when the ECD is subjected to a high-temperature durability test for a long period of time.

The present inventors found that contrast degradation was mainly caused by a modification or malfunction of iridium hydroxide of the reversibly oxidizable layer, and that a transparent dispersion or mixture consisting of metal iridium, iridium oxide or iridium hydroxide as a disperse phase and a transparent solid dispersion medium can be used to effectively prevent degradation of contrast, thereby attaining the present invention.

The present inventors also found that when the transparent dispersion consisting of metal iridium, iridium oxide or iridium hydroxide as a disperse phase and a transparent solid dispersion medium was used, the dispersion could be used as an electrode, thereby eliminating the need for an adjacent electrode layer (E).

According to an aspect of the present invention, there is provided an electrochromic device including one electrode layer (A), a cathodically coloring electrochromic layer (B), an ionic conductive layer (C) if required, a reversibly oxidizable layer (D) and another electrode layer (E), at least one of said one electrode layer (A) and said other electrode layer (E) being transparent, and at least one of the cathodically coloring electrochromic layer (B), the ionic conductive layer (C) and the reversibly oxidizable layer (D) being adapted to contain protons or include a proton source for emitting protons upon application of a voltage, wherein the reversibly oxidizable layer (D) comprises a transparent dispersion layer (D1) which is made by vacuum then film formation techniques or thick-film processes and which comprises a metal iridium, iridium oxide or iridium hydroxide disperse phase (D11) and a transparent solid dispersion medium (D12).

According to another aspect of the present invention, there is provided an electrochromic device including one electrode layer (A), a cathodically coloring electrochromic layer (B), an ionic conductive layer (C) if required, a reversibly oxidizable layer (D) and another electrode layer (E), at least one of said one electrode layer (A) and said other electrode layer (E) being transparent, and at least one of the cathodically coloring electrochromic layer (B), the ionic conductive layer (C) and the reversibly oxidizable layer (D) being adapted to contain protons or include a proton source for emitting protons upon application of a voltage, wherein the reversibly oxidizable layer (D) and said other electrode (E) are replaced with a single transparent conductive dispersion layer (D1a) which is made by vacuum thin film formation techniques or thick-film processes and which comprises a metal iridium, iridium oxide or iridium hydroxide disperse phase (D11) and a transparent conductive solid dispersion medium (D12a).

At least one of the electrodes (A) and (E) is transparent. If neither of the electrodes is transparent, a change in coloring of the electrochromic layer cannot be externally observed.

The transparent electrode material is selected from tin oxide, indium oxide, indium tin oxide (ITO), zinc oxide and the like. The thickness of the transparent electrode layer varies in accordance with transparency and a resistance but generally falls within the range of 0.01 to several microns. Therefore, the transparent electrode layer is formed by a vacuum thin film formation technique such as vacuum deposition, reactive deposition, ion plating, reactive ion plating or sputtering. The transparent electrode layer may be formed by the so-called thickfilm processes such as screen printing or coating. When the thick-film processes are used, (1) a paste containing metal compound microparticles or (2) a solution of an organic metal compound such as metal alcoholate or its oligomer is coated and sintered to form the transparent electrode layer. The nontransparent electrode material is selected from light-reflecting electrode materials (e.g., Al, Ag, Pt or Ni) or other electrode materials (e.g., Au, Pd, Cr, Ir, Ru, Rh or C).

The cathodically coloring EC layer (B) comprises amorphous tungsten oxide ($WO_3$) or molybdenum oxide ($MoO_3$). Such an EC layer is formed by the vacuum thin film formation technique to a thickness of 0.01 to several microns.

The ionic conductive layer (C) serves as an insulator for electrons but as a conductor for protons ($H^+$) and hydroxy ions ($OH^-$). The layer (C) is optionally formed for the ECD to maintain the coloring state even if the voltage is cut off therefrom after the ECD has colored (i.e., it provides a memory function to the ECD). The layer (C) comprises:

(1) a dielectric material, e.g., tantalum oxide ($Ta_2O_5$), niobium oxide ($Nb_2O_5$), zirconium oxide ($ZrO_2$), titanium oxide ($TiO_2$), hafnium oxide ($HfO_2$), alumina ($Al_2O_3$), yttrium oxide ($Y_2O_3$), lanthanum oxide ($La_2O_3$), silicon oxide ($SiO_2$), magnesium fluoride, zirconium phosphate, or a mixture thereof (a thin film of such a dielectric material serves as an insulator for electrons but as a conductor for protons ($H^+$) and hydroxy ions ($OH^-$));

(2) a solid electrolyte such as sodium chloride, potassium chloride, sodium bromide, potassium bromide, $Na_3Zr_2Si_2PO_{12}$, $Na_{1+x}ZrSi_xP_{3-x}O_{12}$, $Na_5YSi_4O_{12}$, or $RbAg_4I_5$;

(3) a water or proton source-containing synthetic resin such as a copolymer of $\beta$-hydroxyethyl methacrylate with 2-acrylamide-2-methylpropane sulfonic acid, a hydrate vinyl copolymer (e.g., a hydrate methyl methacrylate copolymer), or a hydrate polyester;

(4) an electrolytic solution of an acid (e.g., sulphuric acid, hydrochloric acid, phosphoric acid, acetic acid, butyric acid, or oxalic acid) or an aqueous solution thereof, an aqueous solution of an alkali (e.g., sodium hydroxide or lithium hydroxide), or an aqueous solution of a solid strong electrolyte (e.g., sodium chloride, lithium chloride, potassium chloride, or lithium sulfide; or (5) a semi-solid gel electrolyte, for example, obtained by gelling an electrolytic aqueous solution with a gelling agent (e.g., polyvinyl alcohol, CMC, agar-agar or gelatin).

Among these materials, the dielectric material obtained in (1) is suitable for forming a very thin solid film by a vacuum thin film formation technique. In addition, the dielectric material has good transparency and is preferable. However, when a layer underlying the ionic conductive layer (C) need not be visually observed, the layer (C) does not have to be transparent.

A vacuum thin film formation technique, thick-film processes, casting, injection, coating or other means can be used to form the ionic conductive layer (C). The thickness of the layer (C) falls within the range of 0.01 μm to 1 mm in accordance with the type of material.

The transparent dispersion layer (D1) comprises a mixture of a metal iridium, iridium oxide or iridium hydroxide disperse phase (D11) and a transparent solid dispersion medium (D12). An oxide or hydroxide is preferably used for the disperse phase (D11).

The dispersion medium (D12) is preferably selected from (1) transparent conductive inorganic oxides (e.g., $SnO_2$, $In_2O_3$, ITO or ZnO), transparent inorganic oxides (e.g., $Ta_2O_5$, $TiO_2$, $SiO_2$, $WO_3$, $MoO_3$ or $Sb_2O_3$) and (2) transparent inorganic fluorides (e.g., $MgF_2$ or $CaF_2$). Among these materials, $SnO_2$, $In_2O_3$, ITO, ZnO and $Ta_2O_5$ are most preferred. The transparent solid conductive dispersion medium (D12a) is selected from $SnO_2$, $In_2O_3$, ITO, and ZnO given in (1) above. The transparent dispersion electrode (D1a) comprises a dispersion medium (D12a) and a disperse phase (D11).

The transparent dispersion layer (D1) and the dispersion electrode (D1a) are prepared in the following manner. Reference symbol $M_1$ denotes metal iridium of the disperse phase (D11); $M_1O$, an oxide thereof; $M_2$, a metal itself of the dispersion medium (D12) or (D12a); $M_2O$, an oxide thereof; and $M_2F$, a fluoride thereof.

(i) Thermal evaporation from resistance-heated sources, electron-beam-heated sources, RF-heated sources or laser-beam-heated sources (i-a) Nonreactive Vacuum Deposition The following two types of vapor sources are used:
(1) $M_1$ or $M_1O$,
(2) $M_2O$ or $M_2F$.

Since iridium as $M_1$ is active immediately after deposition is performed, $M_1$ is often oxidized to $M_1O$ upon exposure to the outer atmosphere.

(i-b) Reactive Vacuum Deposition

The following two types of vapor sources are used together with an activating means (e.g., RF ion plating, RF heating) in the presence of $O_2$ gas:
(1) $M_1$ or $M_1O$,
(2) $M_2$, $M_2O$ or $M_2F$.

(ii) RF Sputtering (ii-a) Nonreactive RF Sputtering

The following multi-targets or composite targets are used in the presence of an inert gas:
(1) $M_1$ or $M_1O$,
(2) $M_2O$ or $M_2F$.

(ii-b) Reactive RF Sputtering

The following multi-targets or composite targets are used in the presence of $O_2$ gas:
(1) $M_1$ or $M_1O$,
(2) $M_2$ or $M_2O$.

(iii) DC Sputtering

The following multi-targets or composite targets are used in the presence of $O_2$ gas (an inert gas may be contained therein):
(1) $M_1$,
(2) $M_2$.

(iv) Others (iv-a) Thermal Oxidation

After a thin metal mixture film of $M_1$ and $M_2$ is formed by method (i), (ii) or (iii) or wet plating, the film is heated at a temperature of 250° to 300° C. to oxidize the film, thereby obtaining a dispersion layer (D1 or D1a) of $M_1$ and $M_2O$, or a dispersion layer (D1 or D1a) of $M_1O$ and $M_2O$. $M_2$ may be selected from Sn, In, Ta, Ti, Si, W, Mo and Sb.

(iv-b) Anodic Oxidation

After a thin metal mixture film of $M_1$ and $M_2$ is formed by method (i), (ii) or (iii) or wet plating, the film is anodically oxidized in an electrolytic solution, thereby obtaining a dispersion layer (D1 or D1a) of $M_1$ and $M_2O$, or a dispersion layer (D1 or D1a) of $M_1O$ and $M_2O$. $M_2$ is limited to a valve metal such as Ta, Ti, W or Sb.

As described above, $M_1O$ represents an oxide. However, when water is present adjacent to $M_1O$, $M_1O.H_2O$ can be rewritten as $M_1(OH)$. Therefore, $M_1O$ may also include a hydroxide. In this sense, the metal oxide and the metal hydroxide which constitute the disperse phase (D11) cannot be strictly distinguished from each other.

It is essential that the disperse phase (D11) be contained as microparticles in the dispersion medium (D12 or D12a). For this purpose, it is preferable to use the vacuum thin film formation techniques described above to prepare the dispersion layer (D1 or D1a). However, it is possible to form the dispersion layer (D1 or D1a) by the thick-film processes such as wet plating, screen printing or coating. In this case, an organic metal compound such as metal alcoholate is required as a material.

The dispersion layer (D1) of the present invention preferably contains 5 to 95% by weight of the disperse phase (D11). The dispersion electrode (D1a) also preferably contains 5 to 95% by weight of the disperse phase (D11).

In the dispersion layer (D1) or the dispersion electrode (D1a) as the main feature of the present invention, even if a coloring voltage is applied thereto, the layer (D1) or (D1a) can be visually observed with or without coloring in accordance with a content of the disperse phase (D11).

A thickness of the dispersion layer (D1) is 0.01 μm to 1 mm. A thickness of the dispersion electrode (D1a) is 0.1 μm to 0.5 mm.

As described above, protons are required for coloring of the cathodically coloring electrochromic layer B. For this purpose, protons or a proton source are required in at least one of the layers (B), (C) and (D1). When the proton source is water, it need not be provided during the fabrication of ECDs since water can be naturally permeated from the outer atmosphere into the ECD. A time required for exposing the ECD immediately after its fabrication can be less than a few seconds. As the result, the required moisture is contained in the layer. Every time the layer (B), (C) or (D1) is formed during the fabrication process, the resultant structure may be exposed in atmosphere.

The overall structures of the ECDs according to the present invention are illustrated in FIGS. 1 to 6, respectively. When practical applications of ECDs are considered, the ECDs are preferably sealed with a synthetic resin such as epoxy resin so as to prevent water from being evaporated from the layer and to protect the finished ECDs.

When a DC voltage of about 1.0 to 1.8 V is applied between the electrode layers (A) and (E) or (A) and (D1a) of the corresponding ECD, the electrochromic layer colors blue within 0.01 to several seconds. This coloring state is maintained when the layer (C) is present even if the voltage is cut off. When a reverse voltage having substantially the same magnitude as that of the coloring voltage is applied between the electrode layers, the electrochromic layer becomes transparent within a period of time slightly shorter than the time required for coloring of the electrochromic layer. The pair of electrodes may be short-circuited to bleach the electrochromic material although it takes a longer time than that of the case wherein the reverse voltage is applied The ECD of the present invention will neither consume water upon operation thereof nor generate $O_2$ and $H_2$ gases in the same manner as an ECD having a symmetrical structure between the reducible electrochromic layer and the oxidizable layer. In addition, the ECD of the present invention is transparent immediately after the fabrication thereof. For this reason, unlike the conventional ECD, the ECD of the present invention does not require conditioning (repetition of coloring/bleaching for providing transparent properties). In addition, degradation of contrast after the high-temperature durability test is substantially eliminated.

The ECD of the present invention can be applied to a display unit replacing a conventional liquid crystal display, a transmitted or reflected light amount control device (e.g., a vehicle mirror whose reflected amount of light is variable), or the like.

DESCRIPTION OF THE PREFERRED EMBODIMENTS (Example 1)

A glass substrate (not shown) having an ITO electrode (E) with a thickness of 0.15 μm was prepared. A transparent dispersion layer (D1) having an iridium oxide disperse phase (D11) and a tin oxide dispersion medium (D12) was formed by RF ion plating on the ITO electrode (E) to a thickness of 0.07 μm under the following conditions:
 Vapor source: two-component system of metal Sn and metal Ir
 Back pressure: $5 \times 10^{-6}$ Torr
 $O_2$ partial pressure: $3 \times 10^{-4}$ Torr
 Substrate Temperature: 20° C.
The content of the disperse phase (D11) in the dispersion layer (D1) was 20% by weight.

A transparent ionic conductive layer (C) was formed by vacuum deposition on the transparent dispersion layer (D1) to a thickness of 0.5 μm under the following conditions:
 Vapor source: $Ta_2O_5$
 Back pressure: $5 \times 10^{-6}$ Torr
 $O_2$ partial pressure: $4 \times 10^{-4}$ Torr
 Substrate Temperature: 150° C.

Subsequently, a transparent amorphous $WO_3$ layer (B) was formed by vacuum deposition on the transparent ionic conductive layer (C) to a thickness of 0.5 μm under the following conditions:
 Vapor source: $WO_3$
 Back pressure: $5 \times 10^{-6}$ Torr
 Ar partial pressure: $4 \times 10^{-4}$ Torr
 Substrate Temperature: 150° C.

Figure 1:
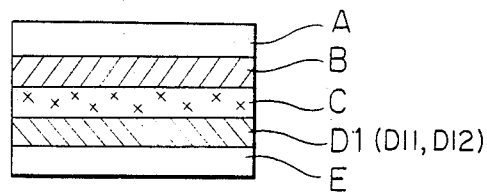
FIGS. 1 to 6 are longitudinal sectional views of ECDs according to embodiments of the present invention, respectively.

Finally, a transparent ITO electrode (A) was formed by RF ion plating on the transparent amorphous $WO_3$ layer B to a thickness of 0.25 μm under the following conditions:
 Vapor source: mixture of $In_2O_3$ and $SnO_2$
 Back pressure: $5 \times 10^{-6}$ Torr
 $O_2$ partial pressure: $3 \times 10^{-4}$ Torr
 Substrate Temperature: 150° C.
Thus, the ECD shown in FIG. 1 was prepared. After the electrode (A) was formed, the resultant ECD was removed from a vacuum chamber. A voltage of 1.4 V was applied between the electrodes (A) and (E), and the ECD colored blue. It is assumed that moisture is permeated into the layers (B), (C) and (D) immediately after the finished ECD is removed from the vacuum chamber. It should be noted that when coloring/bleaching of the ECD is repeated in a vacuum, the density of coloring is gradually decreased.

After the ECD removed from the vacuum chamber was sealed with epoxy resin, a voltage of 1.4 V was applied between the electrodes, and the ECD colored blue within 50 msec. In this case, a transmittance Tc was 20% at a wavelength λ=600 nm. This coloring state was maintained even after the voltage was cut off. When a reverse voltage of −1.4 V was applied between the electrodes, the ECD became transparent within 40 msec. In this case, a transmittance Tb was 85%.

Figure 3:
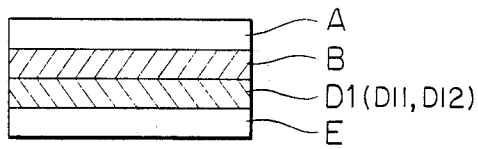

The ECD as shown in FIG. 3 represents the ECD of this embodiment excluding the layer (C). The ECD as shown in FIG. 3 does not have a memory ability.

(Example 2)

A glass substrate having an ITO display electrode (A) was prepared in the same manner as in Example 1. A transparent dispersion layer (D1) having an iridium oxide disperse phase (D11) and an $MgF_2$ dispersion medium (D12) was formed by RF ion plating on electrode layer (A) to a thickness of 0.15 μm under the following conditions:
 Vapor source: two-component system of $MgF_2$ and metal Ir
 Back pressure: $5 \times 10^{-6}$ Torr
 $O_2$ partial pressure: $3 \times 10^{-4}$ Torr
 Substrate Temperature: room temperature
The content of the disperse phase in the dispersion layer (D1) was 30% by weight.

Figure 2:
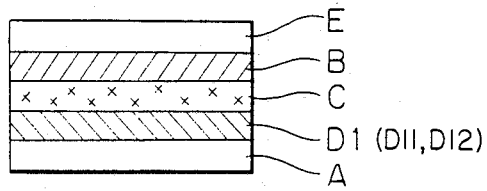

A transparent ionic conductive layer (C), a $WO_3$ layer (B) and another ITO electrode (E) were sequentially formed in the same manner as in Example 1 to prepare an ECD shown in FIG. 2.

When the ECD was sealed with epoxy resin and then subjected to a coloring/bleaching test in the same manner as in Example 1, the transmittances Tc and Tb were 25% and 85% (λ=600 nm).

Figure 4:
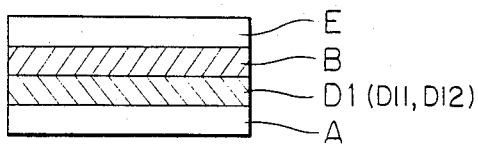

The EDC as shown in FIG. 4 represents the ECD of this embodiment excluding the layer (C). The EDC as shown in FIG. 4 does not have a memory ability.

(Example 3)

The same ECD was prepared in the same manner as in Example 1, except that a transparent dispersion layer (D1) comprised an iridium oxide disperse phase (D11) and a tantalum pentaoxide dispersion medium (D12).

(Example 4)

A glass substrate having an ITO electrode (A) with a thickness of 0.1 μm was prepared. A transparent dispersion layer (D1) was formed by RF ion plating on the electrode (A) to a thickness of 0.05 μm under the following conditions:
 Vapor source: two-component system of metal Sn and metal Ir
 Back pressure: $5 \times 10^{-6}$ Torr $O_2$ partial pressure: $3\times10^{-4}$ Torr
Substrate Temperature: 20° C.

The dispersion layer (D1) comprised 30% by weight of iridium oxide (i.e., a disperse phase D11) and 70% by weight of tin oxide (i.e., a dispersion medium D12).

A transparent ionic conductive layer (C) was formed by vacuum deposition on the transparent dispersion layer (D1) to a thickness of 0.5 μm under the following conditions:

Vapor source: $Ta_2O_5$
Back pressure: $5\times10^{-6}$ Torr
$O_2$ partial pressure: $4\times10^{-4}$ Torr
Substrate Temperature: 150° C.

Subsequently, a transparent amorphous $WO_3$ layer (B) was formed by vacuum deposition on the transparent ionic conductive layer (C) to a thickness of 0.5 μm under the following conditions:

Vapor source: $WO_3$
Back pressure: $5\times10^{-6}$ Torr
Ar partial pressure: $4\times10^{-4}$ Torr
Substrate Temperature: 150° C.

Finally, an aluminum electrode (E) was formed on the $WO_3$ layer B to a thickness of 0.1 μm under the following conditions:

Vapor source: metal Al
Back pressure: $5\times10^{-6}$ Torr
Substrate Temperature: 20° C.

Since the electrode (E) of the resultant ECD (see FIG. 2) is reflective, light incident on the substrate can be reflected therefrom. When a voltage is applied between the electrodes (A) and (E), a reflectance of the ECD can fall within the range between 70% and 12% ($\lambda=600$ nm). Therefore, this ECD can be suitably used as a vehicle mirror.

(Example 5)

A glass substrate was prepared. A transparent dispersion electrode (D1a) having an iridium oxide disperse phase (D11) and a tin oxide dispersion medium (D12a) was formed by RF ion plating on the substrate to a thickness of 0.07 μm under the following conditions:

Vapor source: two-component system of metal Sn and metal Ir
Back pressure: $5\times10^{-6}$ Torr
$O_2$ partial pressure: $3\times10^{-4}$ Torr
Substrate Temperature: 20° C.

In this case, the content of the disperse phase (D11) was 20% by weight, and a sheet resistance of the electrode (D1a) was 500 ω☐.

A transparent ionic conductive layer (C) was formed by vacuum deposition on the dispersion electrode (D1a) to a thickness of 0.5 μm under the following conditions:

Vapor source: $Ta_2O_5$
Back pressure: $5\times10^{-6}$ Torr
$O_2$ partial pressure: $4\times10^{-4}$ Torr
Substrate Temperature: 150° C.

Subsequently, a transparent amorphous $WO_3$ layer (B) was formed by vacuum deposition on the transparent ionic conductive layer (C) to a thickness of 0.5 μm under the following conditions:

Vapor source: $WO_3$
Back pressure: $5\times10^{-6}$ Torr
Ar partial pressure: $4\times10^{-4}$ Torr
Substrate Temperature: 150° C.

Finally, a transparent ITO electrode (A) was formed by RF ion plating on the $WO_3$ layer (B) to a thickness of 0.25 μm under the following conditions:

Vapor source: mixture of $In_2O_3$ and $SnO_2$
Back pressure: $5\times10^{-6}$ Torr
$O_2$ partial pressure: $3\times10^{-4}$ Torr
Substrate Temperature: 150° C.

Figure 5:
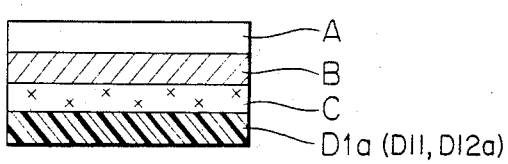

The ECD shown in FIG. 5 was thus prepared. After this ECD was sealed with epoxy resin, a coloring voltage of +1.4 V was applied between the electrodes (A) and (D1a), and the ECD colored blue within 400 msec. In this case, a transmittance Tc was 20% at the wavelength $\lambda=600$ nm. Even if the voltage was cut off, the coloring state was maintained. When a bleaching voltage, i.e., a reverse voltage of −1.4 V was applied between the electrodes, the ECD became transparent within 350 msec. In this case, a transmittance Tb was 85%.

Figure 6:
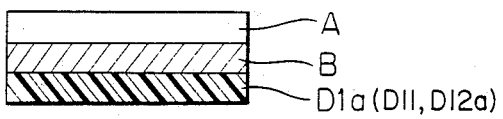

The ECD as illustrated in FIG. 6 represents the ECD of this embodiment excluding the layer (C). The EDC as shown in FIG. 6 does not have a memory ability.

(Example 6)

A glass substrate with an ITO electrode (E) in the same manner as in Example 1 was prepared. A transparent dispersion layer (D1) having an iridium oxide disperse phase (D11) and an $SnO_2$ dispersion medium (D12) was formed by RF sputtering on the ITO electrode (E) to a thickness of about 0.2 μm under the following conditions:

Target: sintered body of $SnO_2$ and metal Ir
Back pressure: $5\times10^{-6}$ Torr
Ar partial pressure: $5\times10^{-3}$ Torr
$O_2$ partial pressure: $1\times10^{-3}$ Torr
Substrate Temperature: room temperature The content of the disperse phase (D11) in the layer (D1) was 10% by weight.

A transparent ionic conductive layer (C) and a $WO_3$ layer (B) were formed in the same manner as in Example 1, and finally an ITO electrode (A) having a thickness of 0.25 μm was formed in the same manner as in Example 5.

The resultant ECD was sealed with epoxy resin and a DC voltage of +1.4 V was applied between the electrodes (A) and (E). A transmittance was decreased to 20% ($\lambda=600$ nm) within 150 msec. When a bleaching voltage of −1.4 V was applied, a transmittance was recovered to 70% within 150 msec.

(Example 7)

A glass substrate with an ITO electrode (E) was prepared in the same manner as in Example 1. A transparent dispersion layer (D1) having an iridium oxide disperse phase (D11) and an $SiO_2$ dispersion medium (D12) was formed by RF sputtering on the ITO electrode (E) under the following conditions:

Target: A metal Ir disk having a thickness of 1 mm and a diameter of 5 inches and a sector-shaped metal Sn plate having a thickness of 1 mm and placed on the disk (a ratio of the Ir area to the Sn area is 2:1)
Back pressure: $5\times10^{-6}$ Torr
$O_2$ partial pressure: $2\times10^{-2}$ Torr
Substrate Temperature: room temperature The disperse phase (D11) in the dispersion layer (D1) was 95%.

Under the same conditions as in Example 6, a transparent ionic conductive layer (C), a $WO_3$ layer (B) and an ITO electrode (A) were formed, and the resultant ECD was sealed. When a DC voltage of +1.4 V was applied between the electrodes (A) and (E), a transmittance was 20% (λ=600 nm) within 150 msec. However, when a bleaching voltage of −1.4 V was applied between the electrodes (A) and (E), a transmittance was 85% within 150 msec.

(Comparative Example 1)

A glass substrate was prepared in the same manner as in Example 1. A transparent EC layer (D) of only iridium oxide was formed by RF ion plating on the ITO electrode (E) to a thickness of 0.07 μm under the following conditions:

Vapor source: metal Ir
Back pressure: $5 \times 10^{-6}$ Torr
$O_2$ partial pressure: $3 \times 10^{-4}$ Torr
Substrate Temperature: 20° C.

Thereafter, layers (C), (B) and (A) were formed in the same manner as in Example 1 to prepare an ECD. The resultant ECD was slightly brown colored before a coloring voltage was applied between the electrodes (A) and (E). After the ECD was sealed with epoxy resin and a rectangular voltage of ±1.5 V, 0.5 Hz was applied between the electrodes (A) and (E) in air for 500 minutes, the ECD did not completely become transparent. After the ECD was bleached, a coloring voltage of ±1.5 V was applied between the electrodes (A) and (E), and a transmittance was 15% (λ=600 nm) within 150 msec. Subsequently, a bleaching voltage of −1.5 V was applied between the electrodes (A) and (E), and a transmittance was 50% (λ=600 nm) within 100 msec.

(High-Temperature Durability Test)

After the contrast ratios of the sealed ECDs prepared in Examples 1 and 2 and Comparative Example 1 were calculated, they were subjected to the high-temperature durability test at a temperature of 80° C. for 200 hours. After the test was completed, their contrast ratios were calculated again. The test results are summarized in Table 1. In this case, the contrast ratios were calculated in the following manner:

Contrast Ratio=log (T1/T2) or log (R1/R2) for
λ=600 nm.

wherein
T1: the saturated transmittance (%) during bleaching,
T2: the saturated transmittance (%) during coloring,
R1: the saturated reflectance (%) during bleaching, and
R2: the saturated reflectance (%) during coloring.

TABLE 1

| | (High-Temperature Durability Test Data) | |
|---|---|---|
| | Contrast Ratio | |
| ECD | Before Testing | After Testing |
| Example 1 | 0.63 | 0.62 |
| Example 2 | 0.53 | 0.51 |
| Example 4 | 0.76 | 0.74 |
| Example 5 | 0.63 | 0.62 |
| Example 6 | 0.54 | 0.50 |
| Example 7 | 0.60 | 0.50 |
| Comparative Example 1 | 0.52 | 0.30 |

What is claimed is:

1. An electrochromic device including one electrode layer, a cathodically coloring electrochromic layer, an ionic conductive layer, a reversibly oxidizable layer and another electrode layer, at least one of said one electrode layer and said other electrode layer being transparent, and at least one of said cathodically coloring electrochromic layer, said ionic conductive layer and said reversibly oxidizable layer being adapted to contain protons or include a proton source for emitting protons upon application of a voltage, wherein said reversibly oxidizable layer comprises a transparent dispersion layer which is made by vacuum thin film formation techniques or thick-film processes and which comprises a metal iridium, iridium oxide or iridium hydroxide disperse phase and a transparent solid dispersion medium.

2. A device according to claim 1, wherein said dispersion layer contains 5 to 95% by weight of said disperse phase.

3. A device according to claim 1, wherein said dispersion medium comprises at least one material selected from the group consisting of tin oxide, indium oxide, indium tin oxide, zinc oxide, tantalum oxide, titanium oxide, silicon oxide, tungsten oxide, molybdenum oxide, antimony oxide, magnesium fluoride and calcium fluoride.

4. A device according to claim 3, wherein said dispersion medium comprises at least one material selected from the group consisting of tin oxide, indium oxide, indium tin oxide and zinc oxide.

5. A device according to claim 1, wherein said cathodically coloring electrochromic layer comprises amorphous tungsten oxide.

6. A device according to claim 1, wherein said ionic conductive layer comprises at least one material selected from the group consisting of tantalum oxide, silicon oxide, magnesium fluoride, zirconium oxide, niobium oxide, alumina, hafnium oxide and yttrium oxide.

7. A device according to claim 1, wherein said cathodically coloring electrochromic layer comprises amorphous tungsten oxide, said ionic conductive layer comprises tantalum oxide, said disperse phase comprises iridium oxide or iridium hydroxide, and said dispersion medium comprises tin oxide.

8. An electrochromic device including an electrode layer, a cathodically coloring electrochromic layer, an ionic conductive layer, and a reversibly oxidizable layer, at least one of said cathodically coloring electrochromic layer, said ionic conductive layer and said reversibly oxidizable layer being adapted to contain protons or include a proton source for emitting protons upon application of a voltage, wherein said reversibly oxidizable layer is comprised of a transparent conductive dispersion material, is made by vacuum thin film formation techniques or thick-film processes, and comprises a metal iridium, iridium oxide or iridium hydroxide disperse phase and a transparent conductive solid dispersion medium.

9. A device according to claim 8, wherein said electrode layer is transparent.

10. A device according to claim 8, wherein said dispersion material electrode contains 5 to 95% by weight of the disperse phase.

11. A device according to claim 8, wherein said dispersion medium comprises at least one material selected from the group consisting of tin oxide, indium oxide, indium tin oxide and zinc oxide.

12. A device according to claim 8, wherein said cathodically coloring electrochromic layer comprises amorphous tungsten oxide.

13. A device according to claim 8, wherein said ionic conductive layer comprises at least one material selected from the group consisting of tantalum oxide, silicon oxide, magnesium fluoride, zirconium oxide, niobium oxide, alumina, hafnium oxide and yttrium oxide.

14. An electrochromic device including one electrode layer, a cathodically coloring electrochromic layer, a reversibly oxidizable layer and another electrode layer, at least one of said one electrode layer and said other electrode layer being transparent, and at least one of said cathodically coloring electrochromic layer and said reversibly oxidizable layer being adapted to contain protons or include a proton source for emitting protons upon application of a voltage, wherein said reversibly oxidizable layer comprises a transparent dispersion layer which is made by vacuum thin film formation techniques or thick-film processes and which comprises a metal iridium, iridium oxide or iridium hydroxide disperse phase and a transparent solid dispersion medium.

15. A device according to claim 14, wherein said dispersion layer contains 5 to 95% by weight of said disperse phase.

16. A device according to claim 14, wherein said dispersion medium comprises at least one material selected from the group consisting of tin oxide, indium oxide, indium tin oxide, zinc oxide, tantalum oxide, titanium oxide, silicon oxide, tungsten oxide, molybdenum oxide, antimony oxide, magnesium fluoride and calcium fluoride.

17. A device according to claim 16, wherein said dispersion medium comprises at least one material selected from the group consisting of tin oxide, indium oxide, indium tin oxide and zinc oxide.

18. A device according to claim 14, wherein said cathodically coloring electrochromic layer comprises amorphous tungsten oxide.

19. An electrochromic device including an electrode layer, a cathodically coloring electrochromic layer, and a reversibly oxidizable layer, at lease one of said cathodically coloring electrochromic layer and said reversibly oxidizable layer being adapted to contain protons or include a proton source for emitting protons upon application of a voltage, wherein said reversibly oxidizable layer is comprised of a transparent conductive dispersion material, is made by vacuum thin film formation techniques or thick-film processes, and comprises a metal iridium, iridium oxide or iridium hydroxide disperse phase and a transparent conductive solid dispersion medium.

20. A device according to claim 19, wherein said dispersion material contains 5 to 95% by weight of the disperse phase.

21. A device according to claim 19, wherein said dispersion medium comprises at least one material selected from the group consisting of tin oxide, indium oxide, indium tin oxide and zinc oxide.

22. A device according to claim 19, wherein said cathodically coloring electrochromic layer comprises amorphous tungsten oxide.

* * * * *